Patented June 18, 1940

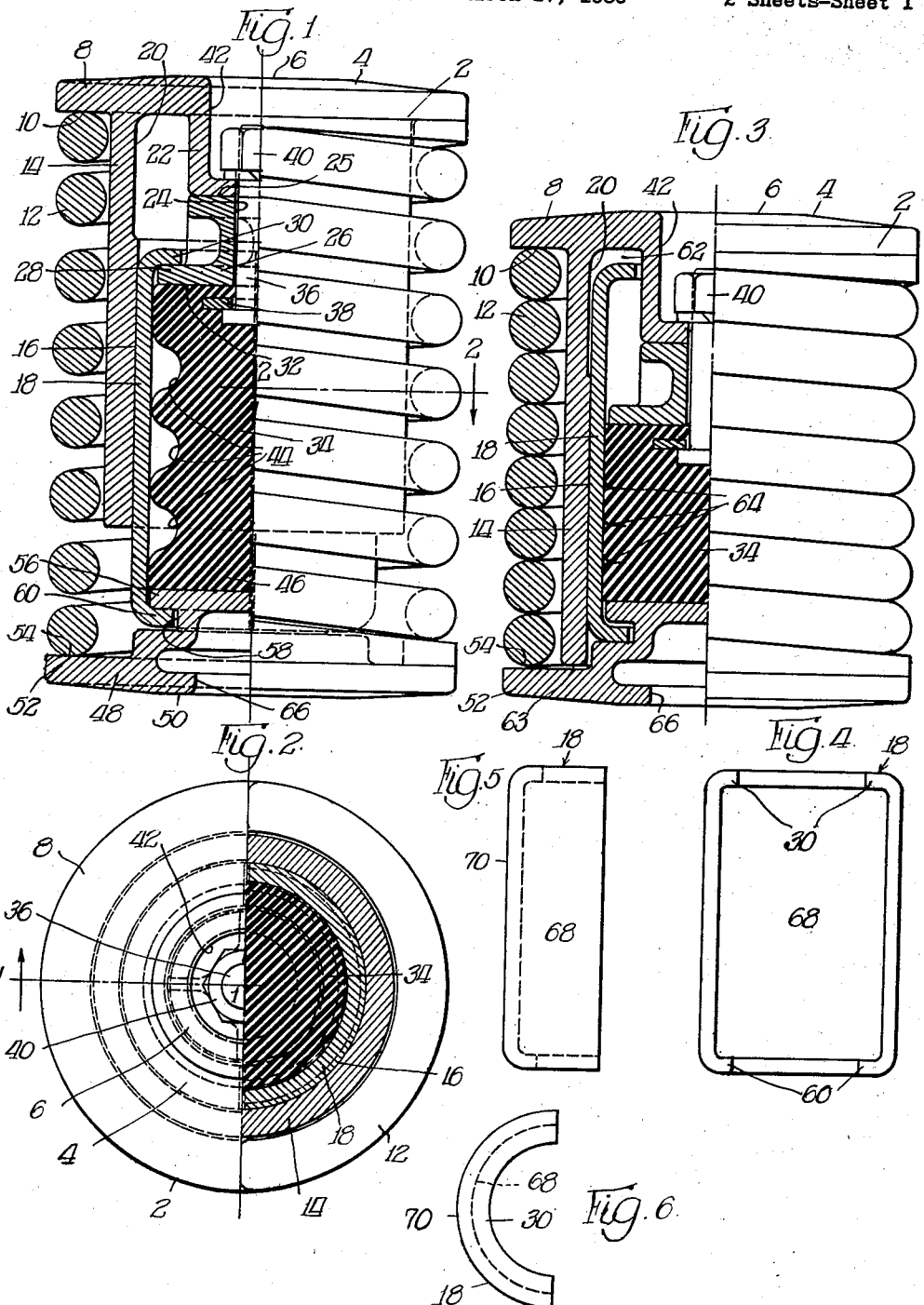

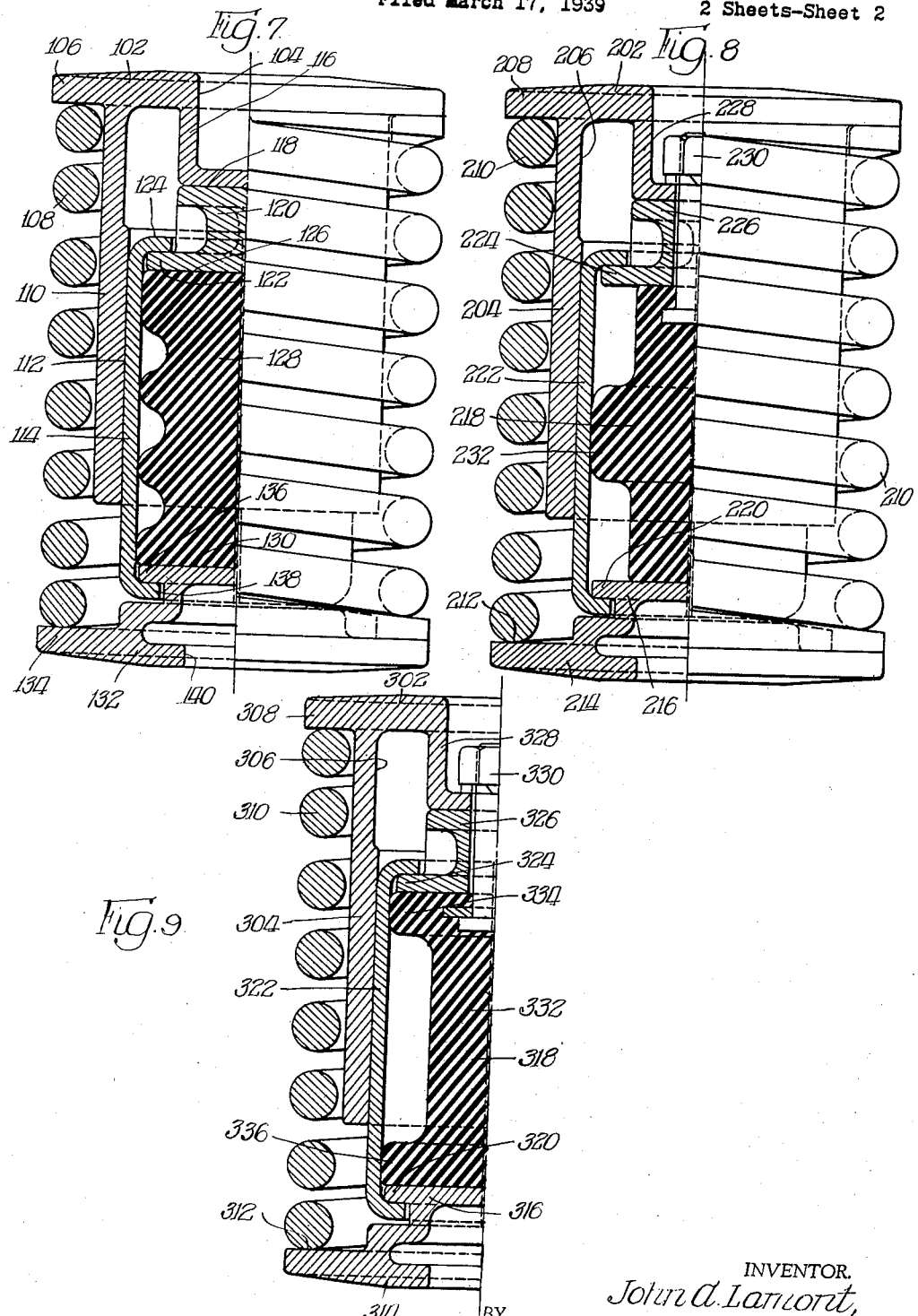

2,205,098

UNITED STATES PATENT OFFICE 2,205,098

SNUBBER

John A. Lamont, Chicago, Ill., assignor to American Steel Foundries, Chicago, Ill., a corporation of New Jersey Application March 17, 1939, Serial No. 262,362

15 Claims. (Cl. 267—9)

My invention relates to a friction absorbing device and more particularly to a form thereof which is suitable for use in a railway car truck.

In recent years friction absorbing devices have been found more and more necessary on railway freight equipment as well as on passenger carrying cars because increased speed of trains results in accentuation of shocks due to track or wheel irregularities. Snubbing devices, as they are commonly called, are utilized for damping such vibrations whether or not they are of synchronous character.

Recent developments have been given to the use of rubber as a resilient means in such snubbing devices. It is recognized that in order for rubber to perform most efficiently as a resilient member constant working of the rubber is required; in other words, if the rubber is permitted to assume a particular shape over a long period of time it will become set in that shape and no longer be efficient as a resilient means. For this reason, in using rubber in such a device as the one herein contemplated, it is necessary so to construct the device that the resilient rubber member will be "worked" whenever the device is subjected to use.

An object of my invention is to devise a friction absorbing mechanism of improved form wherein a rubber spring will be used in such manner as to provide for the working of the rubber whenever the device is operated.

Another object of my invention is a novel form of friction absorbing mechanism wherein a resilient member of rubber composition will be effective to support a portion of the load and, at the same time, operative to compress the friction members into engagement.

My invention further contemplates such an arrangement wherein the parts will be maintained in assembled relationship by the operation of the rubber composition member in developing friction between the parts thereof.

My novel arrangement also comprehends a friction absorbing device wherein the parts normally held in assembled relationship by friction developed therebetween may be dismantled without the use of special tools, except such as may be required simply to overcome the friction developed between the parts in their normal assembled relationship.

Other objects and advantages inherent in my novel friction absorbing device will be apparent from the following description of the associated drawings showing modifications thereof as well as by the appended claims.

Figure 1 is a side elevation, half in section, of a friction absorbing device embodying my invention, the section being taken in a vertical plane bisecting the device substantially as indicated by the line 1—1 of Figure 2, the parts being shown in normal assembled relationship;

Figure 2 is a top plan view, half in section, of the device shown in Figure 1, the section being taken in the horizontal plane bisecting the structure substantially as indicated by the line 2—2 of Figure 1;

Figure 3 is a view of the device in its maximum compressed position, the view being half in side elevation and half in section, with the section taken in the vertical plane bisecting the structure. This view corresponds to Figure 1 except that in Figure 1 the device is not compressed;

Figures 4, 5 and 6 show the form of friction shoe embodied in my device, Figure 4 being an elevation taken from the inner face thereof, Figure 5 a side elevation and Figure 6 a top plan view;

Figure 7 is a view of a modified form of my device, the view corresponding in general to that of Figure 1 and including a half elevation and a half section in a plane bisecting the device;

Figure 8 is a view of a further modification of my device, the view corresponding in general to that shown in Figure 1, the right half of the figure showing an elevation of the device and the left half thereof a sectional view in a plane bisecting the device vertically; and Figure 9 shows a further modification of my invention, the view being shown as a section bisecting the device in a vertical plane and thus corresponding in general to the view shown in the left half of Figure 8.

It will readily be understood by those skilled in the art that the modifications shown in Figures 8 and 9 may be constructed without the use of a retaining bolt as in the modification shown in Figure 7; in other words, the forms of resilient means shown in Figures 8 and 9 may be used in the modification shown in Figure 7 since the parts otherwise are similar.

Describing the structure in greater detail, and referring first to the modification shown in Figures 1 to 3, the structure comprises a top follower 2 having the base 4, the outer face of which forms a convenient seat as at 6 for one end of the device, said top follower having about its perimeter the annular flange 8, the inner face of which forms a convenient seat as at 10 for the coil spring 12. Within the coil spring 12 extends the cylindrical body portion 14 of the top follower, the inner surface of said cylindrical portion having over the greater portion of its length a frictional surface for engagement as at 16 with the outer face of the adjacent friction shoe 18. The upper portion of the cylindrical wall 14 is relieved as at 20 to afford clearance from the end of the friction shoe 18 as the device is placed in compression (Figure 3).

Centrally formed on the inner face of the base 4 is the hollow stud 22 with the central opening 24 and seated against the said stud as at 25 is the spring cap 26 presenting at its inner end the annular flange 28 for a means of engagement with the annular lip 30 formed on the top of each friction shoe 18.

The inner flat face of the spring cap 26 is seated as at 32 against the resilient member 34, and imbedded in the resilient member 34 is the head of the bolt 36 as well as the adjacent washer 38, said bolt extending through the central opening in the spring cap 26 and the aligned opening 24 in the hollow stud 22 to have threaded engagement as at 40 with the associated nut, said nut and the end of said bolt being received in the recess or cavity 42 formed by said hollow stud.

The resilient member 34 in the modification shown has about its periphery a series of annular channels indicated at 44, 44, said channels providing areas into which portions of the resilient member may flow under compression. The base of the resilient member 34 is seated as at 46 in abutment with the inner face of the bottom follower 48, the outer face of said follower forming a seat as at 50 for that end of the device. The follower 48 has about its perimeter the annular flange 52 forming on its inner face a seat as at 54 for the compression spring 12. At the inner end of the follower 48 is formed the annular flange 56 defining the channel 58 within which may be received the annular lip 60 formed on the lower end of each shoe 18, thus providing a means of engagement therewith.

As the device is compressed it takes the form shown in Figure 3 in which it may be noted that the upper end of each shoe 18 is closely adjacent the outer wall or base 4 of the top follower as seen at 62. Likewise, the lower end of the cylindrical portion 14 is in close proximity to the outer wheel of the bottom follower as seen at 63. The annular channels shown at 44, 44 in Figure 1 are substantially filled with the resilient material as may be noted at 64, 64. In movement of the parts from the position shown in Figure 1 to that shown in Figure 3, friction is developed along the surface indicated at 16 where the outer faces of the friction shoes engage the inner face of the cylindrical member 14 of the top follower. The amount of friction developed can be controlled within limits depending upon the character of friction surfaces and the amount of pre-compression of the resilient member 34. When the load is removed the parts will return to their normal positions as shown in Figure 1 and when the device is under partial load intermediate positions will be assumed by the parts.

The cavity 42 centrally formed in the top follower and a similar cavity centrally formed as at 66 in the bottom follower afford convenient positioning means for locating the device when associated with studs upon seating means (not shown).

The detail form of the friction shoe, two of which are associated with each device, is shown in Figures 4, 5 and 6. The shoe is semi-cylindrical in form having a smooth central wall 68 of uniform thickness presenting the smooth outer friction areas 70 along its entire outer surface and having at its upper end the annular lip 30 and at its lower end the annular lip 60 serving as engaging means with the spring cap and bottom follower respectively.

The modification shown in Figure 7 is substantially similar to that previously described except for the omission of the retaining bolt. In the modification of Figure 7 the top follower 102 is substantially similar to that of the previous modification with a central top cavity 104, the annular flange 106 forming a seat for the compression spring 108 and having the cylindrical portion 110 affording on its inner face frictional engagement as at 112 for the friction shoes 114. Centrally formed on the inner face of the end wall of the top follower 102 is the hollow stud 116 providing a seat as at 118 for the spring cap 120 which at its inner end has the annular flange 122 forming a means of connection to the lip 124 at the top end of the shoe 114, said spring cap 120 presenting as at 126 a smooth face for abutment with the resilient means 128, said resilient means being substantially identical in form with the resilient means 34 of the previously described modification. The bottom of the resilient means 128 is seated as at 130 against the bottom follower 132, said bottom follower presenting the outer annular flange 134 affording a seat for the lower end of the compression spring 108. The bottom follower 132 has at its inner end an annular flange 136 for engagement with the bottom lip 138 on the friction shoe 114 and is cored out as at 140 to reduce weight and form a centrally located cavity convenient as positioning means.

As previously noted, this modification differs from that shown in Figure 1 in the omission of the retaining bolt, thus affording a simpler arrangement in that the parts are retained in assembly solely by frictional engagement as at 112 between the walls of the cylindrical member 110 and the friction shoes 114.

In the modification shown in Figure 7 the bottom follower 132, the resilient means 128, the two semi-cylindrical friction shoes 114, 114 and the spring cap 120 are assembled as a unit and inserted within the cylindrical member 110 of the outer follower after the compression spring 108 has been mounted on said cylindrical member and, thereafter, the device is placed under sufficient load to compress the spring 108 and the resilient means 128 until the parts are brought into normal assembled relationship as shown in Figure 7.

In the modification shown in Figure 1 the method of assembly is similar except that the retaining bolt 36 has previously been united to the resilient means 34 in the vulcanizing process or otherwise as convenient. After the assembling operation is completed the nut 40 is threaded upon the end of the bolt 36 which is projected through the aligned openings in the spring cap 26 and the hollow stud 22 of the top follower in the operation of assembly.

The modifications shown in Figures 8 and 9 differ from the modification shown in Figure 1 only in the form of the resilient member. In the modification of Figure 8 the top follower 202 has the cylindrical friction barrel 204 relieved at its upper end as at 206, said follower having also the flange 208 serving as seating means for the compression spring 210, the opposite end of which is seated as at 212 against the follower 214, said follower 214 being formed with the inwardly projecting portion 216 forming a seat for the resilient means 218 and provided with the annular flange 220 forming a means of connection to the shoes 222, both ends of which are flanged over as in the previous modifications. The upper flange of the shoe has engagement with the annular flange 224 on the spring cap 226 which may be secured between the hollow lug 228 of the top follower and the resilient means 218 by the securing bolt and nut assembly 230 which extends through aligned openings in the spring cap 226 and the wall of the lug 228, the said bolt being secured in the resilient means 218 during the vulcanizing process or in any convenient manner prior to the assembling operation.

In this modification of Figure 8, the resilient means 218 is a substantially cylindrical block of rubber composition with the relatively small top and bottom portions and the enlarged central portion defined by the relatively wide annular band 232 forming a substantial area for abutment against the shoes 222. In this modification the abutment of the resilient means 218 against the shoes is at one central area and this area is enlarged in proportion as the resilient means is placed under compression. As initially applied the resilient means is under sufficient compression to afford the desired amount of friction between the parts depending upon the particular application in which the device is to be used.

The modification shown in Figure 9 is generally similar to those previously described with the top follower 302 and the inwardly projecting cylindrical friction barrel 304 relieved as at 306, said follower having the flange 308 forming a seat for the spring 310, the opposite end of which is seated as at 312 against the bottom follower 314 which also has the central projection 316 forming a seat for the resilient means 318. The member 316 has the annular flange 320 providing a means of connection for the flanged over bottom ends of the friction shoes 322, the upper flanged over ends of which have a similar connection as at 324 with the spring cap 326, said spring cap being retained in assembled relationship between the resilient means 318 and the hollow lug 328 of the top follower by means of the bolt and nut assembly 330.

In this modification of Figure 9 the resilient means 318 is of spool-like form having a central cylindrical portion indicated at 332 and the enlarged end portions indicated at 334 and 336, top and bottom respectively. Said end portions provide abutment for the top and bottom followers and with the friction shoes as well. The abutment with the top and bottom followers is of fixed area, but it will readily be apparent that the area of abutment with the shoes will depend upon the amount of compression of the resilient member 318, said area increasing as the said member is compressed.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a friction absorbing device, a compression spring, a top follower seated there-against and having walls extending there-within, a plurality of segmental cylindrical shoes slidably arranged within said walls, a spring cap abutting said top follower, a bottom follower supporting said spring, a resilient member housed within said device and seated at the top against said spring cap, at the bottom against said bottom follower, and engaging said shoes at a plurality of spaced areas to urge said shoes against said walls and retain said parts in assembled relationship by friction therebetween, and annular flanges on said shoes engaging annular flanges on said bottom follower and on said spring cap to limit relative motion therebetween.

2. In a friction absorbing device, a top follower comprising a cylindrical friction barrel, a spring cap seated against said top follower within said barrel, a compression spring seated against said follower and housing said barrel, a bottom follower, a plurality of segmental cylindrical friction shoes slidably arranged within said barrel, interengaging retaining means on said shoes and said bottom follower and said spring cap, and resilient means housed within said device and having abutment against said spring cap, said bottom follower and said shoes, the area of abutment of said resilient means against said shoes being adapted to increase as said device is placed under compression.

3. In a friction absorbing device, a top follower comprising a cylindrical friction barrel, a spring cap seated against said top follower within said barrel, a compression spring seated against said follower and housing said barrel, a bottom follower, a plurality of segmental cylindrical friction shoes slidably arranged within said barrel, interengaging retaining means on said shoes and said bottom follower and said spring cap, and resilient means housed within said device and having abutment against said spring cap, said bottom follower and said shoes, the area of abutment of said resilient means with said spring cap, said bottom follower and said shoes being adapted to increase as said device is compressed.

4. In a friction absorbing device, a compression spring, a top follower having walls extending within said spring, internal friction surfaces on said walls, a spring cap abutting said top follower, a bottom follower, a plurality of shoes extending between said bottom follower and said spring cap in engagement with said friction surfaces, resilient means housed within said device in abutment with said spring cap and said bottom follower and having engagement with said shoes at a plurality of spaced areas, and retaining means on said shoes engaging means on said bottom follower and said spring cap.

5. In a friction absorbing device, a compression spring, a top follower having walls extending within said spring, internal friction surfaces on said walls, a spring cap abutting said top follower, a bottom follower, a plurality of shoes extending between said bottom follower and said spring cap in engagement with said friction surfaces, resilient means housed within said device in abutment with said spring cap and said bottom follower and having engagement with said shoes at a plurality of spaced areas, and retaining means on said spring cap and on said bottom follower engaging retaining means on said shoes to limit relative motion between said parts.

6. In a friction absorbing device, a spring, a top follower having a cylindrical portion extending within said spring, a bottom follower, a plurality of segmental cylindrical friction shoes arranged within said cylindrical portion, a spring cap seated against said top follower within said cylindrical portion, resilient means compressed between said top and bottom followers and urging said shoes outwardly, and retaining means imbedded in said resilient means and extending through aligned openings in said spring cap and said top follower to hold said parts in assembled relationship.

7. In a friction absorbing device, a compression spring, a top follower having walls extending within said spring, internal friction surfaces on said walls, a spring cap abutting said top follower, a bottom follower, a plurality of shoes extending between said bottom follower and said spring cap in engagement with said friction surfaces, resilient means housed within said device in abutment with said spring cap and said bottom follower and having engagement with said shoes at a plurality of spaced areas, and retaining means on said shoes engaging retaining means on said bottom follower.

8. In a friction absorbing device, a compression spring, a top follower seated there-against and having walls extending there-within, a plurality of segmental cylindrical shoes slidably arranged within said walls, a spring cap abutting said top follower, a bottom follower supporting said spring, and a resilient member housed within said device and seated at the top against said spring cap, at the bottom against said bottom follower, and engaging said shoes at a plurality of spaced areas to urge said shoes against said walls and retain said parts in assembled relationship by friction therebetween.

9. In a friction absorbing device, a spring, a top follower having a cylindrical portion extending within said spring, a bottom follower, a plurality of segmental cylindrical friction shoes arranged within said cylindrical portion, a spring cap seated against said top follower within said cylindrical portion, resilient means compressed between said top and bottom followers and urging said shoes outwardly, and retaining means on said shoes engaging means on said bottom follower and said spring cap.

10. In a friction absorbing device, a compression spring, a top follower having a cylindrical portion within said spring, a plurality of segmental cylindrical friction shoes seated within said cylindrical portion, a spring cap seated against said top follower, a bottom follower and resilient means housed within said device in abutment with said shoes, said spring cap and said bottom follower, said resilient means being operable to urge said shoes against said cylindrical portion and frictionally retain said parts in assembled relationship.

11. In a friction absorbing device, a compression spring, a top follower having walls extending within said spring, internal friction surfaces on said walls, a spring cap abutting said top follower, a bottom follower, a plurality of shoes extending between said bottom follower and said spring cap in engagement with said friction surfaces, and resilient means housed within said device in abutment with said spring cap and said bottom follower and having engagement with said shoes at a plurality of spaced areas.

12. A friction absorbing device comprising top and bottom followers, a compression spring therebetween, said top follower having friction walls extending within said spring, a plurality of shoes seated within and against said friction walls and engaging means on said followers, and a resilient member housed within said device and seated against means on said followers, said member having a plurality of spaced areas in abutment with said shoes to urge them into engagement with said friction walls.

13. In a friction absorbing device, an essembly comprising a bottom follower with an integral spring seat, a top follower with an associated spring cap in fixed relationship therewith, a resilient member seated upon said bottom follower and in abutment with said spring cap, and a plurality of segmental cylindrical friction shoes engaging means on said spring seat and on said spring cap to retain said parts in assembled relationship against said resilient member.

14. In a friction absorbing device, a spring, a top follower having a cylindrical portion extending within said spring, a bottom follower, a plurality of segmental cylindrical friction shoes arranged within said cylindrical portion, a spring cap seated against said top follower within said cylindrical portion, and resilient means compressed between said spring cap and bottom follower and urging said shoes outwardly.

15. In a friction absorbing device, a compression spring, a top follower having a cylindrical portion within said spring, a plurality of segmental cylindrical friction shoes seated within said cylindrical portion, a spring cap seated against said top follower, a bottom follower, and resilient means housed within said device in abutment with said shoes, said spring cap and said bottom follower.

JOHN A. LAMONT.